Figure 1:
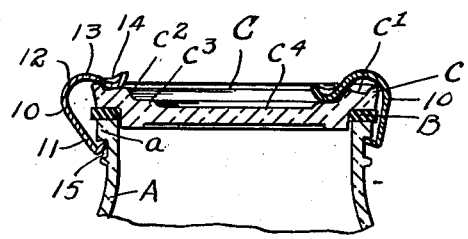

Sept. 4, 1945.  C. H. JUDD  2,384,310
JAR FASTENER
Filed April 7, 1943

INVENTOR.
CHARLES H. JUDD
BY Bates, Teare & McBean
ATTORNEYS.

Patented Sept. 4, 1945

2,384,310

UNITED STATES PATENT OFFICE 2,384,310

JAR FASTENER

Charles H. Judd, Cleveland, Ohio, assignor to Tinnerman Products, Inc., Cleveland, Ohio, a corporation of Ohio Application April 7, 1943, Serial No. 482,098

4 Claims. (Cl. 215—90)

This invention relates to fastening devices adapted to retain covers on jars or similar receptacles. The object of the invention is to provide fastening devices of maximum simplicity which may be readily mounted on the receptacle and by overhanging the cover retain the same in place.

My invention is especially well adapted for use on preserving jars which have a cover seated on an annular gasket on the jar, and it is a further object of the invention to provide the fastening in the form of individual clips of spring sheet metal so shaped that one portion of the clip may hook under a shoulder on the jar while another portion may be readily sprung over the edge of the cover and press down on top thereof to hold the same seated on the gasket.

In one system of preserving it is customary to load the jar with the fruit or other material to be preserved and then heat the jar with its contents until steam or vapor under pressure is produced within the jar which presses up the cover and escapes, after which on condensation of such steam or vapor the cover is retained by vacuum within the jar. In such operation it is very desirable to have a fastening which will retain the cover on the jar against accidental displacement but lightly enough to allow it to be readily lifted by the internal pressure, and which may thereafter be caused to engage the cover more firmly to hold it definitely in place for shipping or storage.

It is accordingly a further object of my invention to provide fastening clips which while anchored to the jar may coact with the cover in either of two positions of the clip to hold the cover lightly or permanently in place. In enabling this dual operation of the fastening device, I employ a special form of cover to coact with the clip in its two locking positions and, hence, the combination of the cover and clip is also a feature of my invention.

For the most effective use of my fastening device, a plurality of clips are employed to engage spaced regions of the cover and retain it in place without other means. Ordinarily two clips located diametrically opposite each other accomplish this purpose very efficiently, but more clips equally disposed about the jar may be employed, if desired.

My invention is illustrated in the drawing hereof, and is hereinafter more fully explained with reference to the embodiment shown in that drawing, and the essential features are summarized in the claims.

Figure 2:
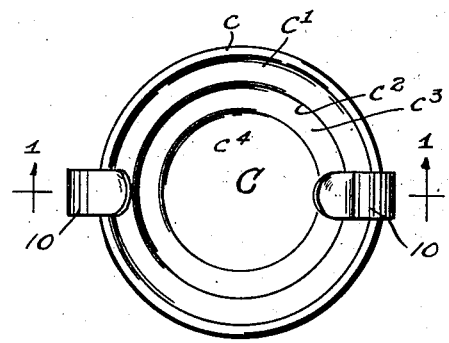
Figure 3:
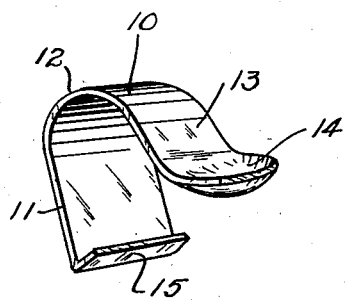

In the drawing, Fig. 1 is an axial section at the upper portion of a jar having a gasket and cover thereon and two of my clips, one clip being shown in its temporary locking position and the other in its final position, this view being a vertical section on the line 1—1 on Fig. 2; Fig. 2 is a plan of the mounted cover with my two clips positioned as in Fig. 1; Fig. 3 is a perspective of the fastening clip itself.

Referring to Figs. 1 and 2, A indicates a jar or other receptacle having at its upper edge an annular external shoulder a. The body of the jar and the material of the shoulder provide a flat annular top surface to the jar, surrounding the open mouth thereof. Resting on this top surface is an annular gasket B and resting on the gasket is the cover C. The cover is formed with an upwardly extending annular rib c at its extreme edge, then a substantially flat annular region c' externally bounded by the rib and terminating at its inner edge at a downwardly inclined wall c—2 which leads to a lower portion c—3. The surface c—3 may be simply the central region of the cover externally bounded by the inclined wall c—2, but preferably it is in the form of an annular ledge, the circular central region c—4 of the cover being depressed below such ledge to save material of the cover.

My clips designated 10 are adapted to engage with the under edge of the jar shoulder a and the annular surface c' of the cover for the temporary holding of the cover, as shown at the left hand, in Figs. 1 and 2, or to engage the surface c—3 of the cover for permanent holding as shown in the case of the right hand clip with Figs. 1 and 2.

The clip is a single piece of spring sheet material bent into the approximate C-shaped form shown in each of the views. The clip is a single parallel-sided strip having a substantially straight body portion 11 curving over for about a semi-circle 12 into a free portion 13 terminating in a downwardly dished rounded end part 14. At the opposite end the body 11 is flanged inwardly, as shown at 15.

In use the flange 15 is adapted to hook under the shoulder a of the jar and then by manual pressure against the body 11 near the bend 12 thereof the free dished end portion 14 is forced over the cover rib c, springing down into engagement with the ledge c'. The rounded under surface of the end portion 14 provides a camming surface adapted to spring up the upper arm 13 as the clip is shoved into place. It, accordingly, is a very simple matter to hook the flange 15 under the annular shoulder and by the pressure of one's thumb against the bend of the clip spring the upper arm over the rib and onto the top of the cover. When two or more clips are so mounted on the jar and cover, as shown in the left hand portion of Fig. 1, the cover is held temporarily in place but lightly enough to allow the internal pressure to escape around the gasket.

When it is desired to change the clip from the temporary holding, as at the left hand of Fig. 1, to the permanent position shown in the right hand portion, it is simply necessary for the operator to press with his thumb against the bend of the clip, whereupon it springs over the annular inner edge of the cover surface c' and rests with its end portion on the surface c—3. In this position the body 11 of the clip extends upwardly close to the periphery of the jar shoulder and cover and with the inner surface of the bend close to the extreme upper edge of the cover and with the free end portion of the clip bearing against the inclined wall c—2 and the lower surface c—3 of the cover. In this position the clips on the jar hug it so closely that they are not likely to be displaced and they operate to hold the cover effectively down on the gasket.

When it is desired to release the clip it is only necessary for the operator to insert the end of his thumb or finger under the projecting edge of the end 14 of the clip, which lies above the adjacent surface of the cover, and press the clip outwardly until it is entirely removed from the cover and jar.

It will be seen that my clip is a very simple device, adapted for ready manufacture, and by being made of strong resilient sheet material, as for instance, spring steel, will operate to hold the cover effectively in place either in the temporary position or the permanent position. The clip is readily changed and the mounting or demounting thereof may be effected without the necessity of using tools of any sort.

I claim:

1. The combination of a receptacle having a mouth and an external shoulder about said mouth, a cover for the receptacle extending over said mouth and shoulder and having a raised top edge, and a clip of a single piece of resilient sheet material having an abrupt projection adjacent its lower end underhanging the shoulder of the receptacle anchoring the clip thereto, said clip having a bent-over free portion adapted to bear against the top surface of the cover, said free portion being downwardly dished both longitudinally and transversely to provide a stiffened camming surface adapted to be forced over said raised edge on the cover.

2. The combination with a receptacle having an external shoulder and a cover adapted to coact therewith having an annular upstanding rib adjacent the periphery of the cover and an annular ledge inside of the rib and a surface lower than the annular ledge mentioned, of a spring clip comprising a single strip of spring material bent on itself to provide a lower arm with an inward flange at its lower end, an intermediate portion curved in a direction to extend over the flange and a free portion at the end of the intermediate portion bent relatively upward at its extreme end so that when the flange underhangs the shoulder the free portion may by inward pressure be sprung over the annular rib of the cover onto the annular ledge and by further pressure may be sprung to coact with the cover surface lower than said annular ledge.

3. A clip adapted to secure a cover to a receptacle comprising a single strip of spring sheet material bent into approximate C-shape to provide a body portion, an abrupt flange at one end of said body portion, and a free end portion at the other end which is downwardly dished in substantially spherical form to provide a stiffened camming surface adapted to slide over the edge of the cover and bear down on the top of the cover.

4. A spring clip for holding a cover on a receptacle comprising a parallel-sided strip of spring sheet metal having at one end a straight inward flange, the clip then continuing as a substantially straight leg for a distance, then curving for substantially a half circle into a region above the flange, then bent away from the flat leg, said last-mentioned bent portion being rounded on its edge and downwardly dished in substantially spherical form to provide a stiffened camming surface which may coact with the cover as the clip is pushed into place and also to provide a lip for engagement in removing the clip.

CHARLES H. JUDD.